United States Patent
Drepper

(10) Patent No.: US 9,135,265 B2
(45) Date of Patent: Sep. 15, 2015

(54) ASYNCHRONOUS VERIFICATION FOR EXTENDED FILE ATTRIBUTES

(75) Inventor: Ulrich Drepper, Los Gatos, CA (US)

(73) Assignee: Red Hat, Inc., Raleigh, NC (US)

( * ) Notice: Subject to any disclaimer, the term of this patent is extended or adjusted under 35 U.S.C. 154(b) by 608 days.

(21) Appl. No.: 12/878,267

(22) Filed: Sep. 9, 2010

(65) Prior Publication Data

US 2012/0066272 A1   Mar. 15, 2012

(51) Int. Cl.
*G06F 17/30* (2006.01)

(52) U.S. Cl.
CPC .... *G06F 17/30144* (2013.01); *G06F 17/30067* (2013.01); *G06F 17/30115* (2013.01)

(58) Field of Classification Search
CPC ............... G06F 17/30067; G06F 17/30115
USPC .......................................................... 707/822
See application file for complete search history.

(56) References Cited

U.S. PATENT DOCUMENTS

| | | | |
|---|---|---|---|
| 5,388,257 A * | 2/1995 | Bauer | 707/741 |
| 2003/0172109 A1* | 9/2003 | Dalton et al. | 709/203 |
| 2007/0033192 A1* | 2/2007 | Sakoh et al. | 707/10 |
| 2008/0172420 A1* | 7/2008 | Konik et al. | 707/202 |
| 2008/0184335 A1* | 7/2008 | Zhang et al. | 726/1 |
| 2008/0229209 A1* | 9/2008 | Matsuzaki | 715/740 |

* cited by examiner

*Primary Examiner* — Joshua Bullock
(74) *Attorney, Agent, or Firm* — Lowenstein Sandler LLP

(57) ABSTRACT

A system receives a notification that a process is requesting access to a file stored in a file system, wherein the process is currently delayed from accessing the file. The system determines whether a current file attribute setting for the requested file is correct in response to receiving the notification and changes the current file attribute setting to a correct file attribute setting in response to determining that the current file attribute setting is not correct. The system sends a notification to allow the process to resume to access the file in response determining that the current file attribute setting is correct or changing the current file attribute setting to the correct file attribute setting.

18 Claims, 4 Drawing Sheets

ASYNCHRONOUS VERIFICATION FOR EXTENDED FILE ATTRIBUTES

TECHNICAL FIELD

Embodiments of the present invention relate to file system access. Specifically, the embodiments of the present invention relate to asynchronously verifying file attributes in a file system to control file access while not preventing concurrent access.

BACKGROUND

Files in a file system can have several file attributes, such as a file ownership attribute, a file access permission, a file label, a file access control list, etc. An operating system can use a file's extended attributes to control access to the file. For example, a security enhanced operating system, such as Security Enhanced Linux® (SELinux), employs measures to ensure that every file in a file system is correctly labeled before any file is accessed. In SELinux, all of the files in a file system must be labeled appropriately in order for the correct policy to be applied when the files are being used. A file label can contain security-relevant information, such as a user, role, type, and, optionally, a level. There are times, however, when files are not labeled and file labels are incorrect. For example, SELinux may be running in a disabled mode, where newly created files are not labeled, or in a permissive mode, where users have permissions to incorrectly label files. In addition, files may be mislabeled because a file system is corrupt, policies have changed, etc.

When a file is not labeled or mislabeled, the operating system can deny a process and/or application access to a file. For example, SELinux can prevent an HTTP Server from reading files that are not correctly labeled. In addition, newly-created files and directories inherit the 'type' of their parent folders, and thus, files placed in an incorrect directory are also labeled incorrectly. To help prevent such problems, at system boot up, the operating system can search the entire file system tree (or a subset) for files which are mislabeled and unlabeled to correctly label the files. As a security measure, SELinux, so far, has to place all processes on hold until the labels for all of the files are verified to ensure that a process is not inadvertently denied access and that newly created files do not inherit the incorrect 'type.' For example, upon a boot up procedure of a computing system, the operating system can walk through a file system tree, file by file, and place all of the processes requesting file access on hold until the entire file system is examined and any mislabeled and unlabeled files are correctly labeled. The processes, however, can be placed on hold for a significant amount of time (e.g., hours, days) depending on the size of the file system, which can result in a large amount of lost business.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for asynchronously verifying extended file attributes for requested files in a file system. A system receives a notification that a process is requesting access to a file stored in a file system, wherein the process is currently delayed from accessing the file. The system determines whether a current file attribute setting for the requested file is correct in response to receiving the notification and changes the current file attribute setting to a correct file attribute setting in response to determining that the current file attribute setting is not correct. The system then sends a notification to allow the requesting process to resume to access the file in response to a determination that the current file attribute setting is correct.

Traditionally, an operating system verifies that the file attributes, such as a file labels, for all of the files in a file system are correct synchronously before any file is accessed. Conventionally, an operating system walks through the file system tree, file by file, and delays starting all of the processes which can request file access until the entire file system is examined and any extended file attributes for any files that are incorrect are corrected. Depending on the size of the file system, the processes can delay startup for a significant amount of time (e.g., hours, days), which can result in a large amount of lost business. Embodiments of the invention provide a mechanism for implementing an asynchronous attribute checking system to reduce the amount of time a process is delayed from accessing a file. A process can resume to access a file before all of the files in the file system are examined and the extended attributes for all of the files are correct. Thus, a process is delayed only if and until the file it is requesting access to is examined and an extended file attribute for the file is correct.

Figure 1:
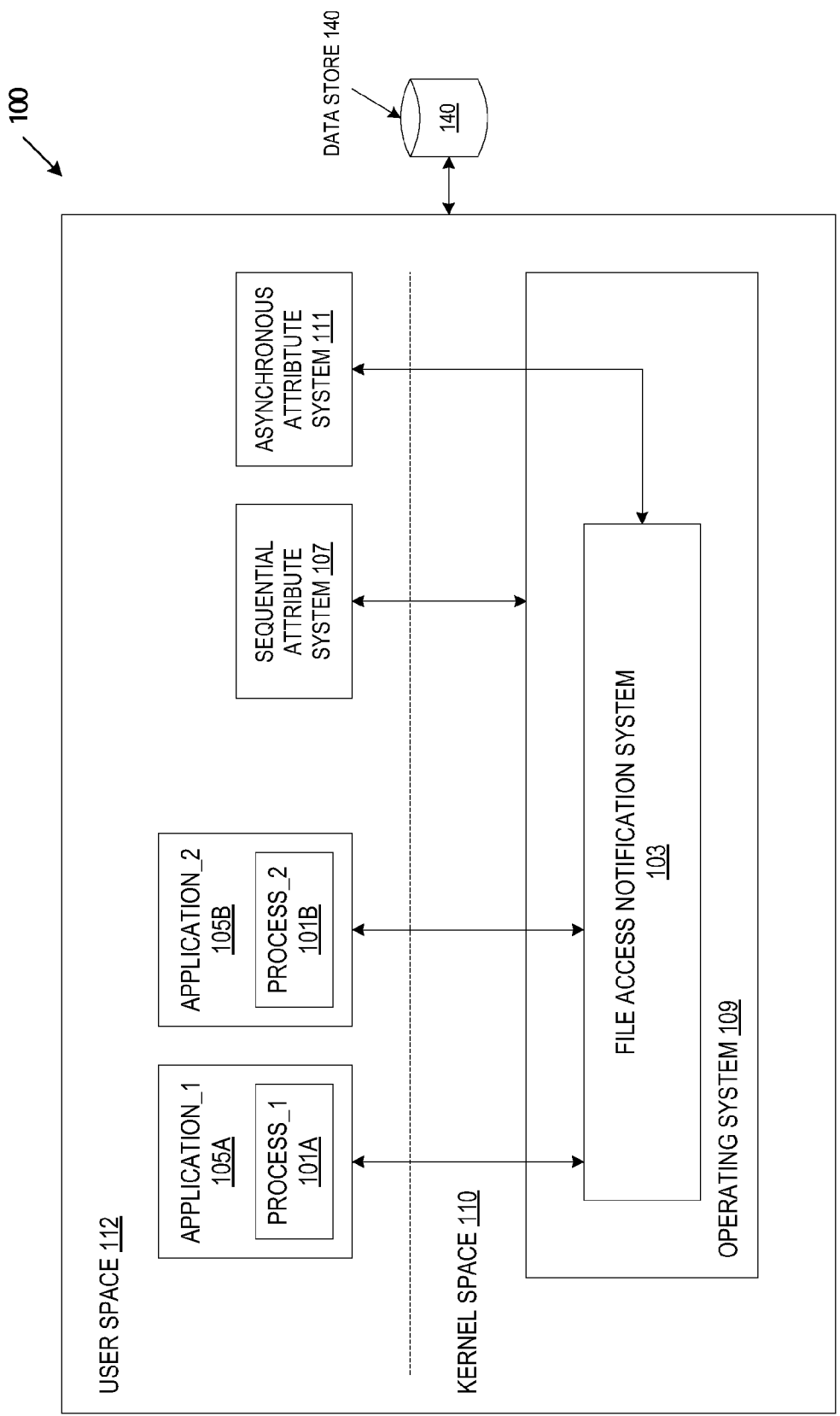
FIG. 1 illustrates an exemplary asynchronous attribute system in which embodiments of the present invention may operate.

FIG. 1 is a block diagram of one embodiment of a system 100 that may be part of a computing system such as a client computer (e.g., a personal computer, a laptop, a PDA, a mobile phone, etc), a server computer, a gateway computer, etc. An exemplary computer system is described in greater detail below in conjunction with FIG. 4. System 100 includes physical memory (main memory), that is mapped to virtual memory, which can be divided into regions, such as user space 112 and kernel space 110. The kernel space 110 is reserved for running an operating system 109 (e.g., Linux® OS, SELinux OS, Windows® OS, etc.). The user space 112 is reserved for user mode applications including user applications, such as Application_1 105A and Application_2 105B. Processes 101A,B are used to execute applications 105A,B. An application 105A,B can be any type of application including, for example, a database management application, a browser application, a web application, a desktop application, etc. The operating system 109 acts as an interface between an application 105A,B and the hardware. Operating systems 109 are responsible for providing essential services within a computer system, such as, the initial loading of programs, file management, and protection facilities. For example, upon a bootup procedure of a computing system, an operating system 109 can execute an initialization program/process (init process).

Access to data stored on a data store 140, such as disks, that is coupled to the system 100, is a central feature of an operating system 109. Computers can store data on a data store 140 (e.g., disks) using files, which can be structured in ways to allow for faster access, higher reliability, and to make better use out of the disk's available space. One way in which files can be stored on a data store 140 (e.g., disk) is called a file system, which enables files to have names and extended file attributes (file attributes) and also allows the files to be stored in a hierarchy of directories or folders arranged in a directory tree. A data store 140 can be a persistent storage unit. A persistent storage unit can be a local storage unit or a remote storage unit. Persistent storage units can be a magnetic storage unit, optical storage unit (e.g., disks), solid state storage unit, electronic storage units (main memory), or similar storage unit. Persistent storage units can be a monolithic device or a distributed set of devices. A 'set', as used herein, refers to any positive whole number of items.

User processes, such as Process_1 101A and Process_2 101B, can request access to one or more files in a file system 140. An operating system 109 can use a file's extended attributes to control access to the file. Examples of extended file attributes can include a file ownership attribute, a file access permission, a file label, a file access control list, etc. For example, a security enhanced operating system, such as Security Enhanced Linux® (SELinux), adds Mandatory Access Control (MAC) to a Linux® kernel, and can enforce an administratively-set security policy over all processes and files in a file system, basing decisions on extended file attributes, such as a file label that contains a variety of security-relevant information. In SELinux, all of the files in a file system must be labeled appropriately in order for the correct security policy to be applied when the files are being used.

Files, however, may not be labeled and/or file labels may be incorrect. For example, SELinux can run in one of three modes: enforcing, permissive, and disabled. In disabled mode or permissive mode, users have permission to label files incorrectly. In addition, any files that are created while SELinux is disabled are not labeled. Files can also be mislabeled because a file system is corrupt, policies have changed, etc. Mislabeled and unlabeled files can cause problems, for example, when a file is not labeled or mislabeled, the operating system 109 can deny a process, such as Process_1 101A, access to a file. For example, SELinux can prevent an HTTP Server from reading files that are not correctly labeled. In addition, in SELinux, newly-created files and directories inherit the label 'type' of their parent folders, and thus, files created in an incorrect directory are also labeled incorrectly.

To prevent incorrectly labeled and unlabeled files from causing problems, an operating system 109 can employ measures to ensure that every file in a file system 140 is correctly labeled before any file is accessed by a user process, such as Process_1 101A and Process_2 101B. For example, at system boot up, a system service, such as a sequential attribute system 107, can perform a sequential procedure of checking that one or more file attributes (e.g., a file ownership attribute, a file access permission, a file label, a file access control list, etc.) for all of the files in a file system 140 tree (or a subset) are correct before any file is accessed by a process. The sequential attribute system 107 can correct the current file attribute setting (e.g., file label setting) if it missing or incorrect. The sequential attribute system 107 can walk through a file system 140 tree, file by file, and as a security measure, the sequential attribute system 107 can delay all of processes (e.g., Process_1 101A and Process_2 101B) from accessing files until one or more attributes for all of the files are verified.

To avoid delaying a process (e.g., Process_1 101A and Process_2 101B) from accessing a file for an extended amount of time, embodiments of the invention implement an asynchronous attribute system 111 that can run in parallel to the sequential attribute system 107 to detect when a process (e.g., Process_1 101A and Process_2 101B) is requesting access to a file, to dynamically (responsive to the process request) verify the current file attribute setting of the requested file is correct, and to immediately allow the process to resume, so it can access the file. The operating system 109 can include a file access notification system 103 to detect when a process 101A,B has to be delayed because the process is requesting access to a file, and the asynchronous attribute system 111 can hook in to the file access notification system 103 to receive notifications when a process 101A,B is requesting access to a file. Upon verifying that the current attribute setting of the file is correct, the asynchronous attribute system 111 can send a notification to the file access notification system 103 to allow a process 101A,B to resume, so it can access the requested file. Thus, a process 101A,B does not have to be placed on hold until all of the files in a file system are verified, but rather, a process 101A,B can be delayed until a current file attribute setting for the requested file is verified. Verifying file attribute settings as a file is needed by a process minimizes the delay a process 101A,B may experience while waiting to access a file.

Figure 2:
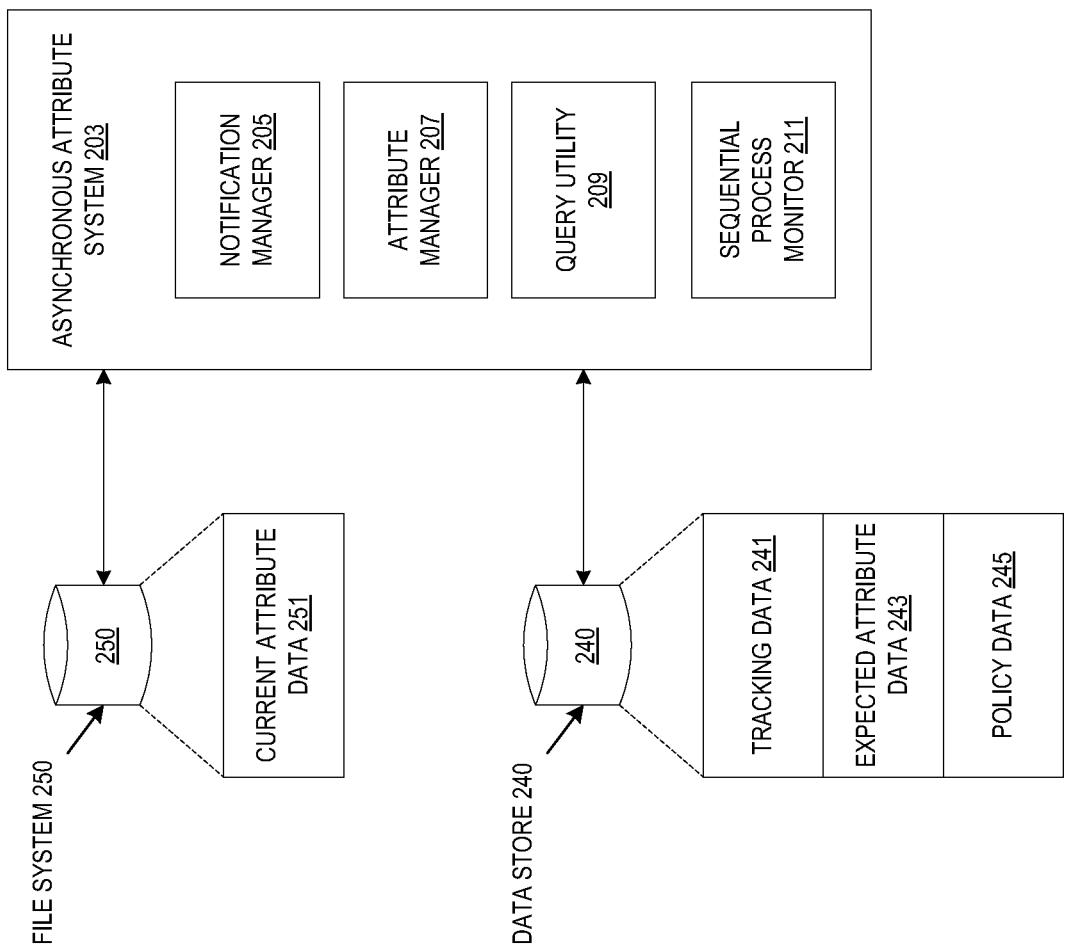
FIG. 2 is a block diagram of one embodiment of an attribute system for asynchronously verifying extended file attributes in a file system.

FIG. 2 is a block diagram of one embodiment of an asynchronous attribute system 203 for asynchronously verifying a current file attribute (file attribute) setting for a requested file in a file system. The asynchronous attribute system 203 may be the same as the asynchronous attribute system 111 of FIG. 1. An operating system can have security rules to control access to files and can base access decisions on extended file attributes (e.g., a file ownership attribute, a file access permission, a file label, a file access control list, etc) of a file. For example, SELinux can have a security rule that before any file is accessed, the file should be correctly labeled.

In SELinux, file labels contain a variety of security-relevant information, such as a user, role, type, and, optionally, a level. A user is an identity known to a policy that is authorized for a specific set of roles. The following is an example of a label for a file 'file1.'

-rw-rw-r--.  user1  group  1  unconfined_u:object_r:user_home_t:s0 file1

In this example, SELinux provides a user (unconfined_u), a role (object_r), a type (user_home_t), and a level (s0), as the current file label setting for file1. SELinux can use this information to make access control decisions. To ensure that files are correctly labeled, at system startup, a sequential attribute system (e.g., sequential attribute system 107 in FIG. 1) can search the entire file system tree (or a subset) for files which are mislabeled and unlabeled to correctly label the files. Without the embodiments of the present invention, the sequential attribute system has to delay all of the processes from accessing files until the sequential attribute system has finished verifying all of the files in the file system tree (or a subset).

An asynchronous attribute system 203 can run in parallel to the sequential attribute system to detect when a delayed process is requesting access to a file, to dynamically verify the current file attribute setting of the requested file in response to the process request, and to allow the requesting process to resume, so it can access the file. The asynchronous attribute system 203 can include a notification manager 205, an attribute manager 207, a query utility 209, and a sequential process monitor 211.

The notification manager 205 can hook into a file access notification system (FA notification system) in an operating system to receive a notification when a process is requesting access to a file. The notification manager 205 can hook into the FA notification system by identifying to the FA notification system the type of notification to be received. A sequential process monitor 211 can detect a sequential attribute system executing a sequential attribute process and can monitor the execution of the sequential attribute process to determine when the sequential attribute process is finished executing. When the sequential process monitor 211 detects that the sequential attribute system has finished checking one or more file attributes for all of the files in a file system, the notification manager 205 can unhook itself from the FA notification system since the sequential attribute system has verified file attributes for all of the files in the file system.

The notification manager 205 can receive a notification from the FA notification system that includes data to uniquely identify the file being requested, such as a pathname of the requested file, a file name of the requested file, etc. The notification can optionally also contain data that identifies which file attribute to verify (e.g., a file label, a file ownership attribute, a file access permission, a file access control list, etc.). The notification manager 205 can identify a file from the notification and can provide the file identifier to an attribute manager 207. Optionally, the notification manager 205 can also identify a file attribute to be verified from the notification and can provide the file attribute to the attribute manager 207. The attribute manager 207 can examine tracking data 241 that is stored in a data store 240 that is coupled to the asynchronous attribute system 203 to determine whether the file attribute for the requested file has been previously verified. A process may have previously requested access to the same file and the attribute manager 207 may have previously verified the specified file attribute for the previously requested file. The tracking data 241 can include the file names of the files that were previously requested, for example, since the computing system began its bootup process, and a list of the file attributes for the files that were previously verified as correct. When the file attribute for the requested file is included in the tracking data 241, the notification manager 205 can immediately send a notification to the FA notification system to allow the delayed process to resume so it can access the file.

When the file attribute for the requested file is not included in the tracking data 241, the attribute manager 207 can determine the current setting for the file attribute for the requested file and determine whether the current file attribute setting is correct. The attribute manager 207 can determine the current attribute setting by examining current attribute data 251 for the requested file, that is stored in a data store 250 (e.g., file system on disks) that is coupled to the asynchronous attribute system 203. An example of current attribute data 251 for a file is file meta data that includes the current file attribute settings for the file.

The attribute manager 207 can determine whether the current file attribute setting for the requested file is correct, for example, by determining whether the current file attribute setting complies with a policy rule that is stored in the data store 240, by determining whether the current attribute setting matches an expected file attribute setting that is dynamically generated by a query utility 209, by determining whether the current attribute setting matches a default setting, by determining whether the current attribute setting matches an expected file attribute setting stored in a data structure, etc.

Policy data 245 can be stored in the data store 240 that includes security rules for which the attribute manager 207 can determine whether a current file attribute setting is correct. For example, a policy rule can define that only root users can access root files, and the attribute manager 207 can determine whether the current user attribute setting complies with the policy rule. The policy data 245 can also include default settings for the file attributes and the attribute manager 207 can determine whether a current file attribute setting matches the default setting.

The attribute manager 207 can determine the expected attribute setting for the requested file by utilizing a query utility 209 and expected attribute data 243. An example of expected attribute data 243 is a mapping (labeling) file, such as a file_contexts file in SELinux. The attribute manager 207 can specify the file (e.g., specify a path name, specify a filename) of the requested file to the query utility 209. In one embodiment, the attribute manager 207 can also specify the file attribute to be verified to the query utility 209. The query utility 209 can use the expected attribute data 243 to determine the expected attribute setting for the requested file. One example of a query utility 209 is a 'matchpathcon' program in SELinux. In one embodiment, the query utility 209 can generate the expected attribute setting using systems services, for example, system services (e.g., setxattr, lsetxattr, fsetxattr, chmod, etc.) used by a matchpathcon program. One embodiment for determining an expected file attribute setting is described in greater detail below in conjunction with FIG. 3. The attribute manager 207 can compare the current file attribute setting to the expected file attribute setting to determine whether they match.

When the current attribute setting for a requested file is correct, the attribute manager 207 can add a file identifier, such as the file name, and a file attribute identifier, such as a file attribute name, to the tracking data 241 to indicate that this particular file attribute for this file name has been verified, and the notification manager 205 can send a notification to the FA notification system to allow the delayed process to resume, so that the process can access the requested file.

When the current attribute setting for the requested file is not correct, the attribute manager 207 can change the current attribute setting in the current attribute data 251 to a new setting (e.g., a correct setting), for example, to comply with a policy rule, to match the expected attribute setting determined by the query utility 209, to match a default setting, etc. The attribute manager 207 can then add the file identifier and the file attribute identifier to the tracking data 241 to indicate that this particular file attribute for this file name has been verified, and the notification manager 205 can send a notification to the FA notification system to allow the delayed process to resume to access the file. In some cases, the attribute manager 207 is not able to change a current file attribute setting, for example, because a file system is corrupt.

Figure 3:
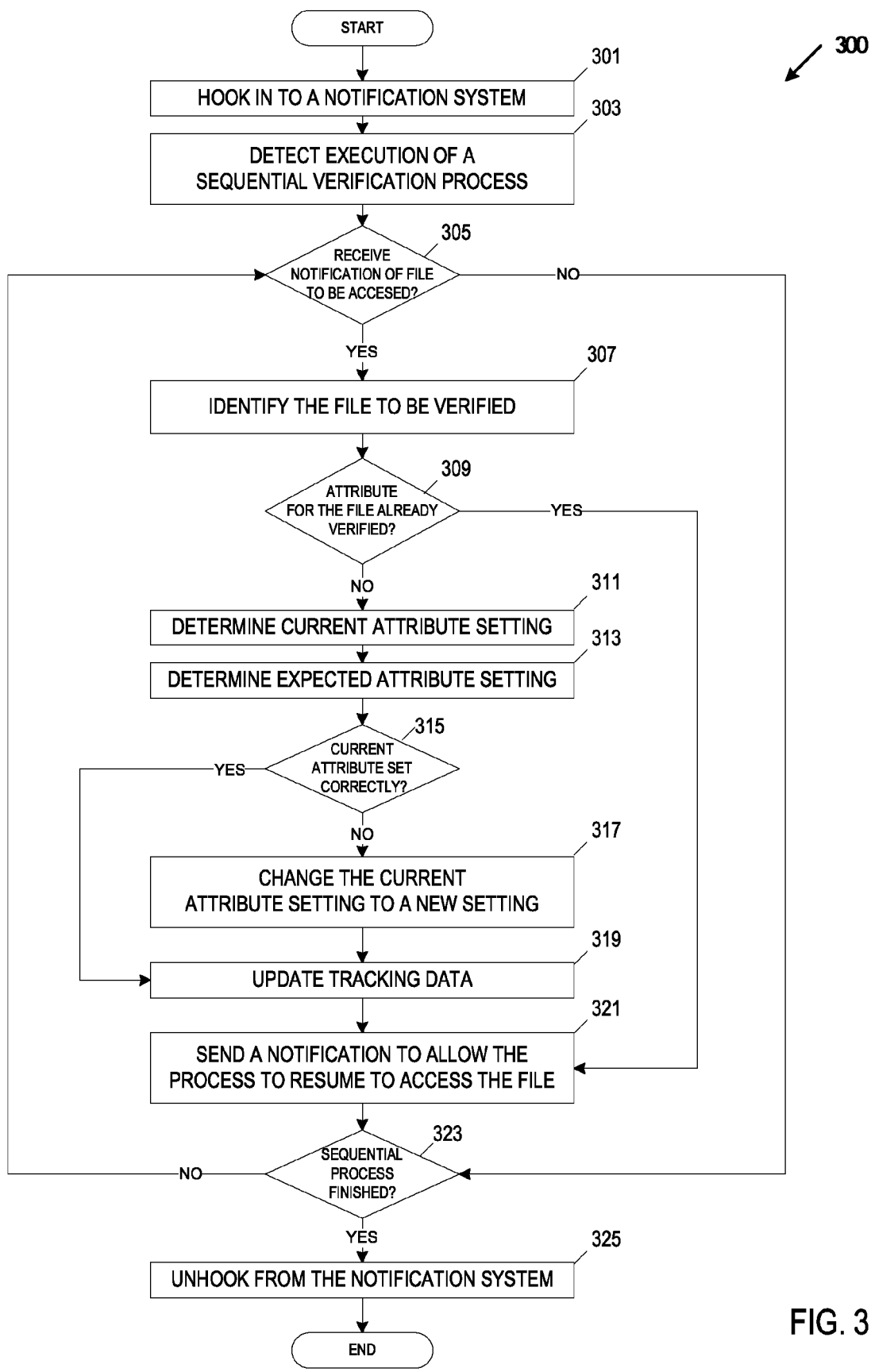
FIG. 3 is a flow diagram of an embodiment of a method for asynchronously verifying extended file attributes in a file system.

FIG. 3 is a flow diagram of an embodiment of a method 300 for asynchronously verifying a current file attribute setting for a requested file in a file system. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the asynchronous attribute system 111 hosted by a computing system of FIG. 1.

A system administrator can request an operating system to delay processes from accessing files in a file system until the operating system can confirm that one or more current file attributes for the files are correct. For example, on systems that run SELinux, all of the files in the file system are labeled in a way that represents security-relevant information, called SELinux context, and a system administrator can request SELinux to execute an asynchronous attribute system to verify that the current file labels for files which processes are requesting access to, are correct before a file is accessed by a process. If the file label setting for a file is not correct the asynchronous attribute system can correct the file label before any process can access the file.

A file access notification system (FA notification system) resides in an operating system and is an interception mechanism to detect when a process is requesting access to a file and to notify the kernel to delay the process from accessing the file. In one embodiment, the method 300 starts with the asynchronous attribute system hooking into the FA notification system at block 301 to receive a notification from the FA notification system when a process is requesting access a file and prior to the process accessing the file. The asynchronous attribute system can specify to the FA notification system the type of notification it is to receive. As is known in the art, the term 'hooking' describes a technique used to alter the behavior of an operating system, of applications, or of other software components by intercepting function calls or messages or events passed between software components. Code that handles such intercepted function calls, events or messages is called a "hook". A hook is used to inject code in original code to handle the interception. A hook can be unset, in which case the program behavior is unchanged. Operating systems and software can provide the means to easily insert event hooks and to remove hooks (unhook) at runtime.

At block 303, the asynchronous attribute system detects execution of a sequential verification process. The asynchronous attribute system can run in parallel to the sequential attribute system that performs a sequential procedure of checking that one or more file attributes (e.g., a file ownership attribute, a file access permission, a file label, a file access control list, etc.) for all of the files in a file system tree (or a subset) are correct before any file is accessed by a process.

At block 305, the asynchronous attribute system determines whether it has received a notification from the FA notification system. If no notification is received, the asynchronous attribute system continues to block 323. If a notification is received, the asynchronous attribute system identifies a file identifier of the requested file at block 307. The notification can include a file identifier, such as pathname for a file, a file name of the file, etc. Files in a file system can have one or more file attributes, such as a file ownership attribute, a file access permission, a file label, a file access control list, etc. In one embodiment, the asynchronous attribute system can verify that all of the attributes for a file are correct. In another embodiment, the asynchronous attribute system can verify that one or more file attributes are correct. The notification can include one or more file attribute identifiers of the attributes to be verified, such as a file attribute name, and the asynchronous attribute system can identify the one or more file attribute identifiers for the attributes to be verified from the notification at block 307. For example, the asynchronous attribute system can receive a notification that includes a file name and the file attribute identifier 'file label.'

In one embodiment, the asynchronous attribute system continues to block 311 to determine the current file attribute setting. In another embodiment, at block 309, the asynchronous attribute system examines tracking data that is stored in a data store that is coupled to the asynchronous attribute system to determine whether the one or more file attributes for the requested file has already been verified. By first determining whether the asynchronous attribute system has already verified the same file attribute(s) for the same file, the asynchronous attribute system can further reduce any delay a process may experience while waiting for the file attribute to be verified. A process may have previously requested access to the same file and the asynchronous attribute system may have previously verified the specified file attribute for the previously accessed file. If the file name and the file attribute are included in the tracking data, the asynchronous attribute system can immediately send a notification to the FA notification system to allow the delayed process to resume, so the process can access the file at block 321. The FA notification system can then notify the kernel to allow the delayed process to resume.

If the file name and the file attribute are not included in the tracking data (block 309), the asynchronous attribute system determines the current setting for the file attribute at block 311. The asynchronous attribute system can execute a command or system call to access the file in the file system to determine the current attribute setting for the requested file. For example, the asynchronous attribute system can execute a 'stat' system call to determine the current setting for the ownership file attribute for the requested file. In another example, the asynchronous attribute system can execute a 'getxattr' system call to determine a current file attribute setting for a file.

At block 313, the asynchronous attribute system determines the expected (correct) setting for a file attribute for a file. The system can execute a command to run a utility that generates and returns the expected file attribute setting. The utility can use expected attribute data, such as policy rules, templates, configuration files, etc., that is stored in a data store that is coupled to the asynchronous attribute system to determine the expected file attribute setting. The expected attribute data can be a data structure which the utility can query. For example, the asynchronous attribute system can execute a 'matchpathcon' command, which queries the expected attribute data, generate the expected attribute setting, and return the expected attribute setting (e.g., the expected file label setting) for the file.

At block 315, the asynchronous attribute system determines whether the current file attribute setting is correctly set. For example, the asynchronous attribute system can determine whether the current file attribute setting complies with a policy rule that is stored in a data store that is coupled to the system. In another example, the asynchronous attribute system can determine whether the current attribute matches the expected file attribute setting from block 313. In one embodiment, the asynchronous attribute system can execute a command that determines both the current file attribute setting and the expected file attribute setting, and compares the current file attribute setting to the expected file attribute setting, and returns a result. For example, the asynchronous attribute system executes a matchpathcon command with a '−V' option to determine whether the current file label setting for a file matches the expected file label setting for the file. The following is an example of a result from the asynchronous attribute system executing the matchpathcon −V command for two file, file1 and file 2 in an html directory.

/var/www/html/file1 has context unconfined_u:object_r:samba_share_t:s0, should be system_u:object_r:httpd_sys_content_t:s0
/var/www/html/file2 verified.

In this example, the result provides an output that explains that file1 is labeled with the samba_share_t type, but should be labeled with the httpd_sys_content_t type, and verifies that file2 has a label that matches the expected file label setting. In one embodiment, if the current file attribute setting is correct (e.g., file2 has a current attribute setting that matches the expected attribute setting), the asynchronous attribute system updates the tracking data at block 319 and sends a notification to the FA notification system at block 321. In another embodiment, if the current file attribute setting is correct, the asynchronous attribute system does not update tracking data and continues to block 321 to send a notification to the FA notification system to allow the delayed process to resume, so that the process can access the file.

If the current file attribute setting is not correct (e.g., file1 does not have a current file attribute setting that matches the expected attribute setting), the asynchronous attribute system changes the current file attribute setting to a new (correct) setting at block 317. For example, the asynchronous attribute system can change the current attribute setting to comply with a policy rule, to match the expected attribute setting, etc. The asynchronous attribute system can execute a system call to set the attribute. For example, the asynchronous attribute system can execute a 'setxattr' system call, a 'lsetattr' system call, and/or a 'fsetxattr' system call to set a file attribute to a new setting. In some cases, the asynchronous attribute system is not able to change a current file attribute setting, for example, because a file system is corrupt, and the asynchronous attribute system can leave the current file attribute setting unchanged at block 317.

In one embodiment, at block 319, the asynchronous attribute system adds a file identifier, such as the file name, and a file attribute identifier, such as a file attribute name, to update the tracking data to indicate that this particular file attribute for this file name has been verified. At block 321, the asynchronous attribute system sends a notification to the FA notification system to allow the delayed process to resume, so that the process can access the file. For example, when the asynchronous attribute system changes a current file attribute setting to match an expected file attribute setting, the asynchronous attribute system can send a notification to the FA notification system and the FA notification system can then notify the kernel to allow the delayed process to resume to access the file.

In one embodiment, at block 323, the asynchronous attribute system determines whether the sequential attribute process, such as a sequential file labeling process, is finished executing. An operating system can provide mechanisms for the asynchronous attribute system to be notified of the process termination of the sequential attribute process. For example, when the sequential attribute process is executing, the asynchronous attribute system can receive a SIGCHLD signal. In another example, the sequential attribute system and the asynchronous attribute system can be executed as part of the same process. but in different threads, and when the sequential attribute system process terminates, it can set a flag variable. When the sequential attribute process has finished checking all of the files in a file system, it may then allow processes to access the files, and the asynchronous attribute system can stop receiving notifications from the FA notification system of any processes requesting access to a file. If the sequential process is finished executing (block 323), the asynchronous attribute system unhooks itself from the FA notification system at block 325.

Figure 4:
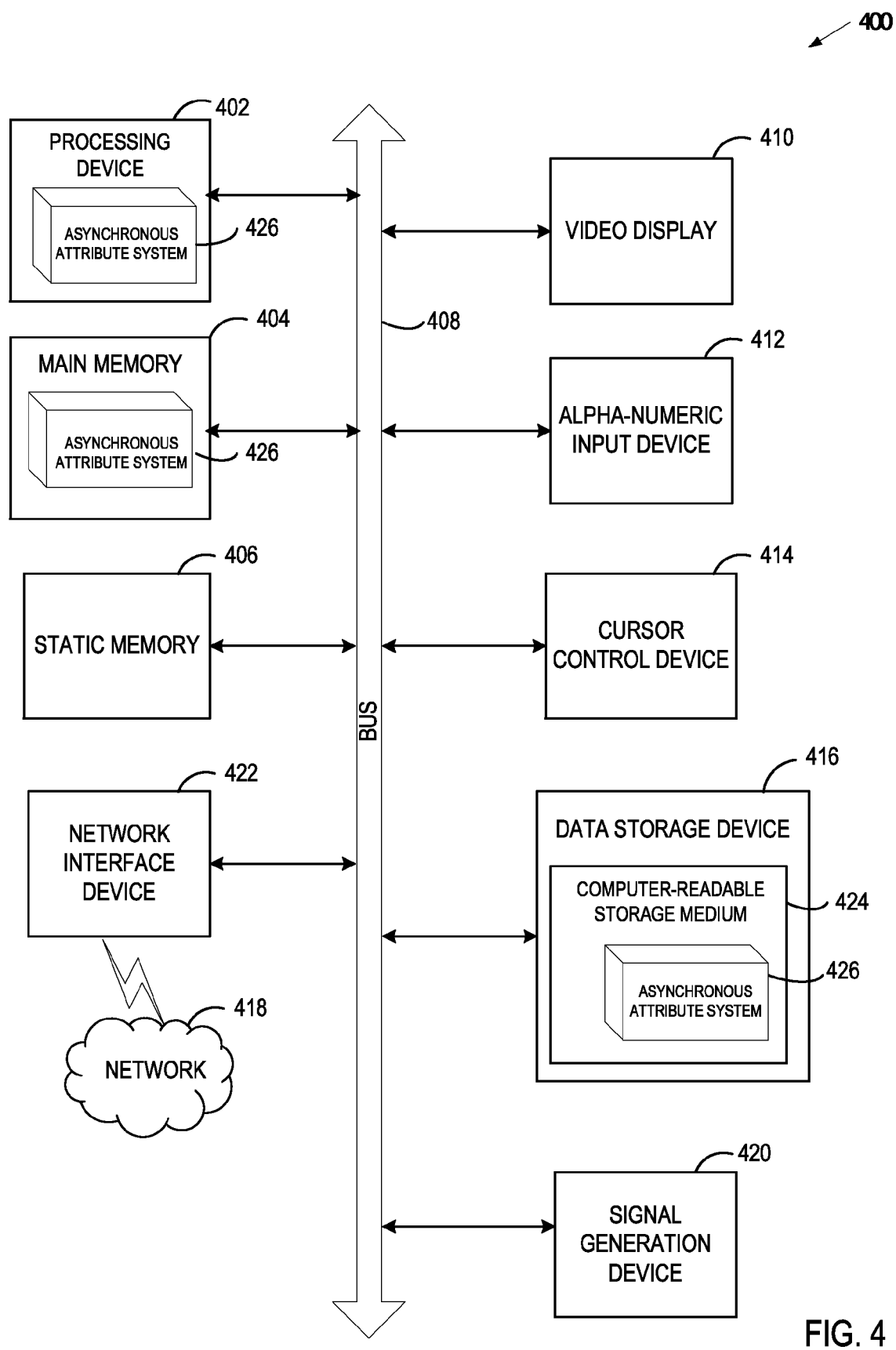
FIG. 4 is a diagram of one embodiment of a computer system for asynchronously verifying extended file attributes in a file system.

FIG. 4 is a diagram of one embodiment of a computer system for asynchronously configuring file attributes in a file system. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the asynchronous attribute system 426 for performing the operations and steps discussed herein.

The computer system 400 may further include a network interface device 422. The computer system 400 also may include a video display unit 410 (e.g., a liquid crystal display (LCD) or a cathode ray tube (CRT) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the asynchronous attribute system 426) embodying any one or more of the methodologies or functions described herein. The asynchronous attribute system 426 may also reside, completely or at least partially, within the main memory 404 and/or within the processing device 402 during execution thereof by the computer system 400, the main memory 404 and the processing device 402 also constituting machine-readable storage media. The asynchronous attribute system 426 may further be transmitted or received over a network 418 via the network interface device 422.

The computer-readable storage medium 424 may also be used to store the asynchronous attribute system 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The asynchronous attribute system 426, components and other features described herein (for example in relation to FIG. 1) can be implemented as discrete hardware components or integrated in the functionality of hardware components such as ASICS, FPGAs, DSPs or similar devices. In addition, the asynchronous attribute system 426 can be implemented as firmware or functional circuitry within hardware devices. Further, the asynchronous attribute system 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "determining," "changing," "sending," "attaching," "monitoring," "detaching," "identifying," "storing," "accessing," "searching," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically generating code for a Web service. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   delaying access to a plurality of files of a file system while a verification process of the file system is executing to determine whether file attribute settings for each of the plurality of files of the file system are correct;
   receiving, from a file access notification system of an operating system, a notification that a user process is requesting access to a file of the plurality of files of the file system while the verification process is executing; and
   in response to receiving the notification that the user process is requesting access to the file while the verification process is executing:
      identifying, by a processing device, that a current file attribute setting for the file has not been previously verified in view of tracking data associated with the verification process that is executing;
      determining that the current file attribute setting for the file is not correct;
      changing the current file attribute setting to a correct file attribute setting; and
      granting the user process access to the file to no longer delay access to the file while the verification process is executing after the changing of the current file attribute setting to the correct file attribute setting.

2. The method of claim 1, wherein the current file attribute setting is a current file label.

3. The method of claim 1, wherein receiving the notification comprises:
   hooking into the file access notification system; and
   receiving the notification from the file access notification system when the user process requests access to the file.

4. The method of claim 3, wherein the verification process is associated with a sequential file labeling process, the method further comprising:
  determining that the sequential file labeling process is executing;
  determining that the sequential file labeling process is finished executing; and
  unhooking from the file access notification system.

5. The method of claim 1, further comprising:
  identifying a file name of the requested file from the notification.

6. The method of claim 1, wherein determining that the current file attribute setting for the file is not correct comprises:
  accessing the requested file in the file system to determine the current file attribute setting for the file;
  determining an expected file attribute setting for the file; and
  determining that the current file attribute setting for the requested file does not match the expected file attribute setting for the requested file.

7. The method of claim 1, wherein:
  changing the current file attribute setting to the correct file attribute setting is performed in response to determining that the current file attribute setting is not correct; and
  granting the user process access to the file is performed in response to changing the current file attribute setting to the correct file attribute setting.

8. A system comprising:
  a memory; and
  a processing device operatively coupled to the memory, the processing device to:
    delay access to a plurality of files of a file system while a verification process of the file system is executing to determine whether file attribute settings for each of the plurality of files of the file system are correct;
    receive, from a file access notification system of an operating system, a notification that a user process is requesting access to the file of the plurality of files of the file system while the verification process is executing; and
    in response to receiving the notification that the user process is requesting access to the file while the verification process is executing:
      identify that a current file attribute setting for the file has not been previously verified in view of tracking data associated with the verification process that is executing;
      determine that the current file attribute setting for the file is not correct;
      change the current file attribute setting to a correct file attribute setting; and
      grant the user process access to the file to no longer delay access to the file while the verification process is executing after the changing of the current file attribute setting to the correct file attribute setting.

9. The system of claim 8, wherein the current file attribute setting is a current file label.

10. The system of claim 8, wherein the processing device is to receive the notification by:
  hooking into the file access notification system; and
  receiving the notification from the file access notification system when the user process requests access to the file.

11. The system of claim 10, wherein the verification process is associated with a sequential file labeling process, and wherein the processing device is further to:
  determine that the sequential file labeling process is executing,
  determine that the sequential file labeling process is finished executing, and
  unhook from the file access notification system.

12. The system of claim 8, wherein the processing device is further to:
  identify a file name of the requested file from the notification.

13. The system of claim 8, wherein the processing device is further to:
  access the requested file in the file system to determine the current file attribute setting for the file;
  determine an expected file attribute for the file; and
  determine that the current file attribute setting for the requested file does not match the expected attribute setting for the requested file.

14. A non-transitory computer-readable medium comprising instructions that, when executed by a processing device, cause the processing device to:
  delay access to a plurality of files of a file system while a verification process of the file system is executing to determine whether file attribute settings for each of the plurality of files of the file system are correct;
  receive, from a file access notification system of an operating system, a notification that a user process is requesting access to a file of the plurality of files of the file system while the verification process is executing; and
  in response to receiving the notification that the user process is requesting access to the file while the verification process is executing:
    identify, by the processing device, that a current file attribute setting for the file has not been previously verified in view of tracking data associated with the verification process that is executing;
    determine that the current file attribute setting for the file is not correct;
    change the current file attribute setting to a correct file attribute setting; and
    grant the user process access to the file to no longer delay access to the file while the verification process is executing after the changing of the current file attribute setting to the correct file attribute setting.

15. The non-transitory computer-readable medium of claim 14, wherein the current file attribute setting is a current file label.

16. The non-transitory computer-readable medium of claim 14, wherein receiving the notification comprises:
  hooking into the file access notification system; and
  receiving the notification from the file access notification system when the user process requests access to the file.

17. The non-transitory computer-readable medium of claim 16, wherein the verification process is associated with a sequential file labeling process, and wherein the processing device is further to:
  determine that the sequential file labeling process is executing;
  determine that the sequential file labeling process is finished executing; and
  unhook from the file access notification system.

18. The non-transitory computer-readable medium of claim 14, wherein determining that the current file attribute setting for the file is not correct comprises:

accessing the file in the file system to determine the current file attribute setting for the file;

determining an expected file attribute setting for the file; and determining that the current file attribute setting for the requested file does not match the expected file attribute setting for the file.

\* \* \* \* \*